United States Patent
Bhanage et al.

(10) Patent No.: US 10,736,143 B2
(45) Date of Patent: Aug. 4, 2020

(54) THRESHOLD OPTIMIZATION FOR OVERLAPPING BASIC SERVICE SETS IN A WIRELESS NETWORK

(71) Applicant: Cisco Technology, Inc., San Jose, CA (US)

(72) Inventors: Gautam Dilip Bhanage, Milpitas, CA (US); Pooya Monajemi, Irvine, CA (US); Brian Donald Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 16/133,580

(22) Filed: Sep. 17, 2018

(65) Prior Publication Data

US 2020/0092912 A1    Mar. 19, 2020

(51) Int. Cl.
*H04W 74/08* (2009.01)
*H04B 17/318* (2015.01)
(Continued)

(52) U.S. Cl.
CPC ...... *H04W 74/0816* (2013.01); *H04B 17/318* (2015.01); *H04W 16/18* (2013.01); *H04W 74/0825* (2013.01); *H04W 84/12* (2013.01)

(58) Field of Classification Search
CPC ........ H04B 17/318–354; H04L 5/0037; H04L 5/0044; H04L 5/0073; H04L 5/0094;
(Continued)

(56) References Cited

U.S. PATENT DOCUMENTS 10,021,721 B2    7/2018  Park et al.
2017/0294949 A1  10/2017  Zhang et al.
(Continued)

FOREIGN PATENT DOCUMENTS

WO    2016112306 A1    7/2016
WO    2017150954 A1    9/2017

OTHER PUBLICATIONS

High Density Experience (HDX) Deployment Guide, May 7, 2015, CISCO, pp. 1-25 (Year: 2015).*
(Continued)

*Primary Examiner* — Michael Thier
*Assistant Examiner* — Prince A Mensah
(74) *Attorney, Agent, or Firm* — Patterson + Sheridan, LLP (57) ABSTRACT

An access point determines the highest signal strength at which it can detect transmissions from other access points or overlapping-basic-service-set (OBSS) client devices associated with the other access points. The access point sets an OBSS packet-detect threshold to the lesser of a minimum cell-size threshold or the highest signal strength and sets a receiver start-of-packet (RxSOP) threshold to the OBSS packet-detect threshold minus an offset. The access point avoids decoding incoming packets when respective signal strengths of the incoming packets do not satisfy the RxSOP threshold. The access point also avoids initiating transmission when incoming packets from the other access points or from the OBSS client devices have signal strengths that satisfy the OBSS packet-detect threshold.

20 Claims, 6 Drawing Sheets

(51) Int. Cl.
*H04W 16/18* (2009.01)
*H04W 84/12* (2009.01)

(58) Field of Classification Search
CPC ............ H04W 16/18; H04W 52/0225; H04W 52/0229; H04W 52/0238; H04W 52/0245; H04W 72/082; H04W 72/085; H04W 74/08; H04W 74/0808; H04W 74/0816; H04W 74/0825; H04W 84/12
See application file for complete search history.

(56) References Cited

U.S. PATENT DOCUMENTS

2018/0110046 A1    4/2018  Patil et al.
2019/0313328 A1* 10/2019  Ma ........................ H04W 16/14

OTHER PUBLICATIONS

N. Akiya, "Seamless Bidirectional Forwarding Detection (S-BFD)", Internet Engineering Task Force, Juniper Networks, pp. 1-15, Apr. 17, 2014.
Alexandra Gates, "What is BSS Coloring in 802.11ax?", Aerohive Networks Blog, pp. 1-3, Mar. 6, 2018.
"Accelerating Microservices Design and Development", Cognizant 20-20 Insights, pp. 1-11, May 2017.

* cited by examiner

THRESHOLD OPTIMIZATION FOR OVERLAPPING BASIC SERVICE SETS IN A WIRELESS NETWORK

TECHNICAL FIELD

The present disclosure generally relates to setting thresholds relating to wireless communication, and in particular, to setting those thresholds for overlapping basic service sets (e.g., for WiFi).

BACKGROUND

As wireless networks (e.g., WiFi networks) become denser and channel bandwidths become wider, the likelihood that network deployments will result in overlapping basic service sets (BSSs) increases. Overlapping BSSs occur when two or more wireless local area networks (WLANs) use the same channel and can at least partially hear each other's transmissions. Multiple thresholds exist that allow this situation to be managed to control cell size (e.g., the size of each WLAN). Failure to configure these thresholds properly can cause multiple problems, however. Co-channel interference and packet collisions may increase. An access point may have overreaching coverage that results in sticky clients that fail to switch to another access point (e.g., to another WLAN) when they should. Accordingly, there is a need for methods and systems of setting thresholds to ensure efficient cell sizes and channel usage.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and systems are disclosed that allow wireless networking thresholds to be set to ensure efficient cell sizes with low co-channel interference and low rates of packet collisions. In some implementations, a first access point of a plurality of access points in a wireless network specifies a minimum cell-size threshold and determines the highest signal strength at which the first access point detects transmissions from other access points or overlapping-basic-service-set (OBSS) client devices associated with the other access points. The first access point sets an OBSS packet-detect threshold to the lesser of the minimum cell-size threshold or the highest signal strength and sets a receiver start-of-packet (RxSOP) threshold to the OBSS packet-detect threshold minus an offset. The first access point avoids decoding incoming packets when respective signal strengths of the incoming packets do not satisfy the RxSOP threshold and avoids initiating transmission when incoming packets from the other access points or from the OBSS client devices associated with the other access points have signal strengths that satisfy the OBSS packet-detect threshold.

Example Embodiments

Figure 1:
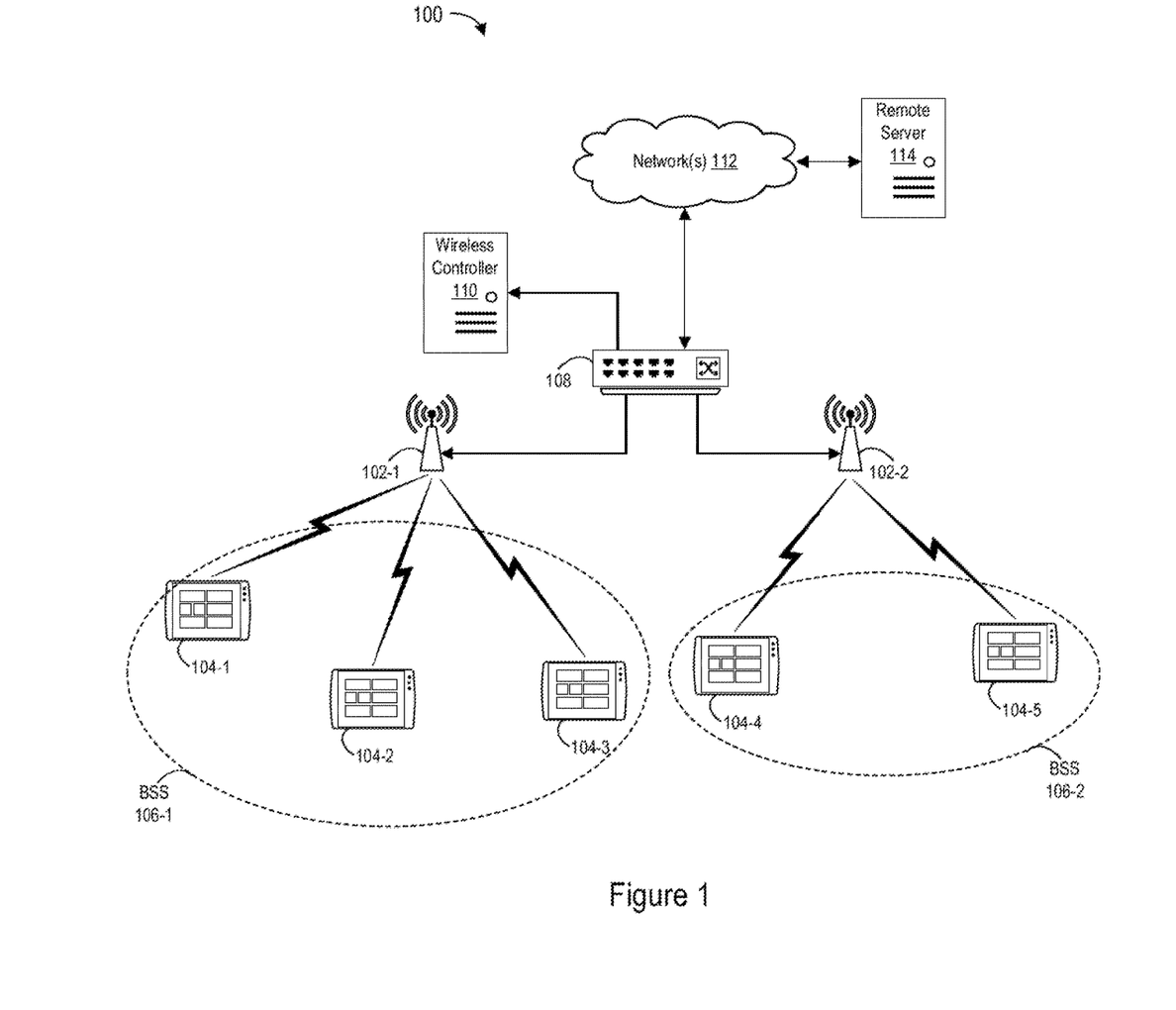
FIG. 1 is a block diagram illustrating a network architecture in accordance with some implementations.

FIG. 1 is a block diagram illustrating a network architecture 100 in accordance with some implementations. A plurality of access points 102-1 and 102-2 communicate wirelessly with client devices 104-1 through 104-5 over one or more wireless channels (e.g., using one or more WiFi protocols). In the example of FIG. 1, client devices 104-1, 104-2, and 104-3 have formed wireless connections and thus become associated with a first access point 102-1, with which they communicate. Client devices 104-4 and 104-5 have formed wireless connections and thus become associated with a second access point 102-2, with which they communicate. Client devices 104-1, 104-2, and 104-3 compose the basic service set (BSS) 106-1 of the first access point 102-1, while client devices 104-4 and 104-5 compose the BSS 106-2 of the second access point 102-2. Examples of the client devices 104 (which may also be referred to as stations or user devices) include mobile electronic devices (e.g., mobile phones), wearable computing devices, laptop computers, tablet computers, desktop computers, and/or other electronic devices.

Wireless transmissions directed to the client devices 104-1, 104-2, and 104-3 in the first BSS 106-1 originate from the first access point 102-1, while wireless transmissions directed to the client devices 104-4 and 104-5 in the second BSS 106-2 originate from the second access point 102-2. Similarly, wireless transmissions directed to the first access point 102-1 originate from the client devices 104-1, 104-2, and 104-3 in the first BSS 106-1, while wireless transmissions directed to the second access point 102-2 originate from the client devices 104-4 and 104-5 in the second BSS 160-2. However, the second access point 102-2 may be able to hear some transmissions from the first access point 102-1 and/or the client devices 104-1, 104-2, and 104-3 in the first BSS 106-1. These transmissions may interfere with the ability of the second access point 102-2 to transmit. For example, an internal request-to-send in the second access point 102-2 may result in a determination that the second access point 102-2 is not clear to send due to a transmission in the first BSS 106-1, causing the second access point 102-2 to avoid initiating transmission. Likewise, an internal request-to-send in the first access point 102-1 may result in a determination that the first access point 102-1 is not clear to send due to a transmission in the second BSS 106-2, causing the first access point 102-1 to avoid initiating transmission. In these situations, the first BSS 106-1 and second BSS 106-2 are overlapping BSSs.

The access points 102-1 and 102-2 may be communicatively coupled to a wireless controller 110, for example through a switch 108. The access points 102-1 and 102-2 may be communicatively coupled with one or more remote servers 114, for example through the switch 108 and one or more networks 112. The one or more networks 112 may include any network or combination of networks, such as the Internet, other wide area networks (WAN), local area networks (LAN), metropolitan area networks (MAN), peer-to-peer networks, and/or ad-hoc connections. The access points 102-1 and 102-2 thereby provide network access (e.g., Internet access) to the client devices 104-1 through 104-5. In some implementations, the wireless controller 110 may be implemented as a remote server 114.

Figure 2:
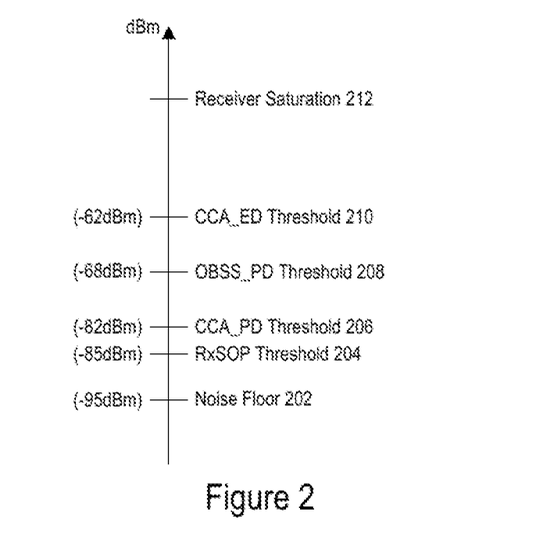
FIG. 2 is a graph showing a number of thresholds related to wireless communications in a network environment with overlapping BS Ss in accordance with some implementations.

FIG. 2 is a graph showing a number of thresholds related to wireless communications in a network environment (e.g., the network architecture 100, FIG. 1) with overlapping BSSs in accordance with some implementations. A noise floor 202 represents a minimum signal-strength level below which packets are lost for lack of signal strength. A receiver-saturation level 212 represents a signal strength above which packets are lost because the receiver becomes saturated. A receiver start-of-packet (RxSOP) threshold 204 represents a signal strength below which incoming packets will not be decoded. Packets with signal strengths between the RxSOP threshold 204 and the receiver-saturation level 212 thus will be decoded. A clear-channel-assessment packet-detect (CCA_PD) threshold 206 represents a signal strength above which the channel will be considered busy when an incoming packet is from within a BSS 106 (i.e., is from an access point 102 or client device 104 of the BSS 106 associated with the receiving device). An OBSS packet-detect threshold 208 represents a signal strength above which the channel will be considered busy when an incoming packet is from an overlapping BSS (i.e., is from an access point 102 or client device 104 of a different BSS 106 than the BSS 106 of the receiving device). The BSS 106 of the transmitting device may be indicated by a BSS color, which is a value specified in the preamble of the packet. An access point 102 and all of the client devices 104 in its BSS 106 thus may specify the same BSS color in the preambles of the packets they transmit. A clear-channel-assessment energy-detect (CCA_ED) threshold 210 is a level above which the channel is considered to be busy, even in the absence of a packet on the channel, due to the presence of energy on the channel. The specific values shown in FIG. 2 are merely examples; actual values may differ. Also, thresholds may be adjusted during operation, as described below. In some embodiments, the RxSOP threshold 204 has a maximum value above which it cannot be set. This maximum value may be based on the CCA packet-detect threshold 206 (e.g., such that the RxSOP threshold 204 is always less than the CCA_PD threshold) and/or the minimum signal level at which client signals within the BSS 106 are received (e.g., such that the RxSOP threshold 204 is always less than, or less than or equal to, this minimum signal level).

Figure 3:
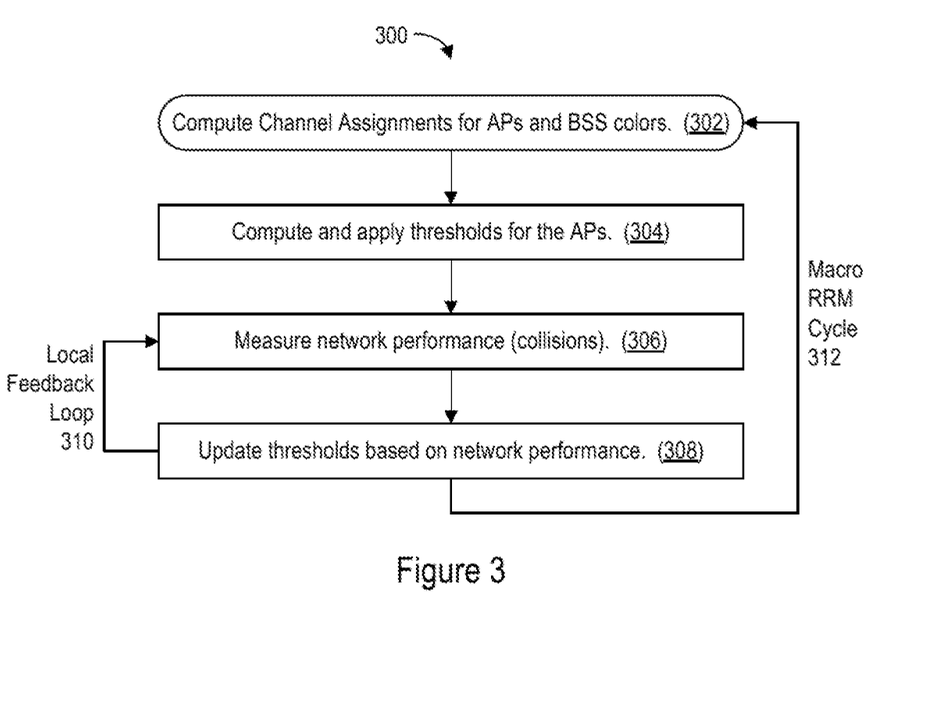
FIG. 3 is a flowchart illustrating a method of managing access points in accordance with some implementations.

FIG. 3 is a flowchart illustrating a method 300 of managing access points in accordance with some implementations. The method 300 is performed by a plurality of access points 102 (e.g., access points 102-1 and 102-2, FIG. 1) and/or the wireless controller 110 (FIG. 1). The method 300 may be performed as part of radio resource management (RRM), which may be under the control of the wireless controller 110. For example, the method 300 is performed repeatedly (e.g., periodically), once per macro RRM cycle 312.

In the method 300, channel assignments are computed (302) for access points 102 and BSS colors (e.g., with each BSS 106 and corresponding access point 102 being assigned a distinct BSS color). Thresholds (e.g., CCA_PD threshold 206, RxSOP threshold 204, OBSS_PD threshold 208, and/or CCA_ED threshold 210, FIG. 2) are computed and applied (304) for the access points 102. In some implementations, the thresholds are computed in turn for each access point 102 in a network (e.g., in order from the access point 102 having the most RRM neighbors on its home channel to the access point 102 having the fewest RRM neighbors on its home channel).

Network performance is measured (306), which includes measuring collisions (e.g., averaging collisions over a specified measurement period). Collisions may include packet collisions and/or BSS color collisions. A BSS color collision occurs when two BSSs are found to be using the same BSS color. In some implementations, request-to-send/clear-to-send (RTS/CTS) exchange failures are counted to measure packet collisions, at least in part. An RTS/CTS exchange failure occurs when a request to send is rejected because the channel is busy. In some implementations, BSS color-collision event reports are obtained from client devices 104 and used, at least in part, to measure the BSS color collisions.

Thresholds are updated (308) based on the network performance (e.g., based at least in part on the measured collisions) as measured in step 306. The steps 306 and 308 may be performed repeatedly (e.g., periodically), in a local feedback loop 310.

The method 300 thus allows thresholds to be updated (e.g., optimized) based on network performance. The method 300 helps to reduce collisions and ensure that network bandwidth is used efficiently.

Figure 4:
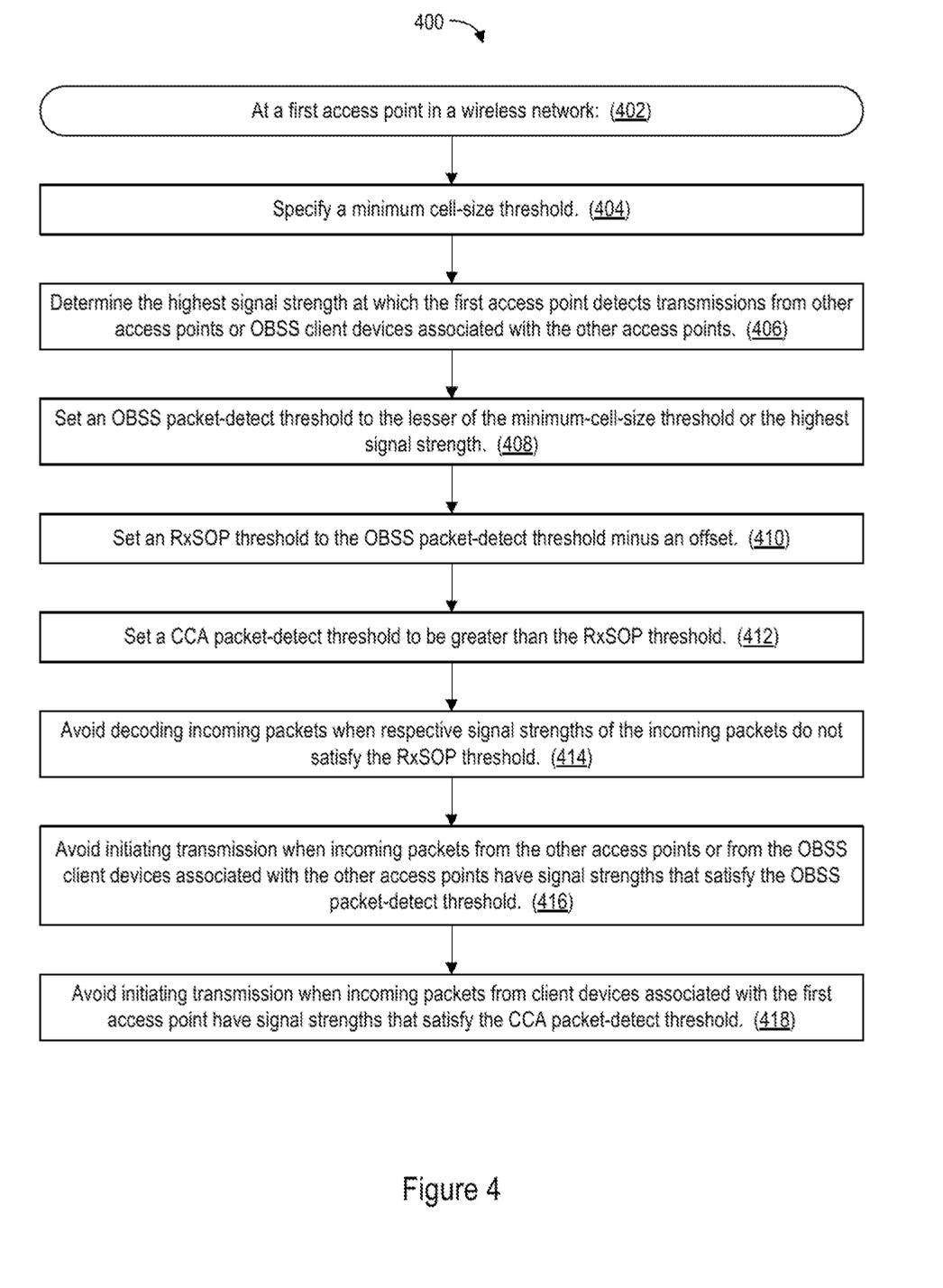
FIG. 4 is a flowchart illustrating a method of computing and applying thresholds for an access point in accordance with some implementations.

FIG. 4 is a flowchart illustrating a method 400 of computing and applying thresholds for an access point 102 in accordance with some implementations. The method 400 is an example of the step 304 of the method 300 (FIG. 3) for a single access point 102 and thus may be performed as part of the method 300. The method 400 is performed (402) at a first access point 102 (e.g., access point 102-1 or 102-2, FIG. 1) in a wireless network.

In the method 400, a minimum cell-size threshold is specified (404). Also, the highest signal strength at which the first access point 102 detects transmissions from other access points 102 or OBSS client devices 104 associated with the other access points 102 is determined (406).

An OBSS packet-detect threshold 208 (FIG. 2) is set (408) to the lesser of the minimum cell-size threshold or the highest signal strength. An RxSOP threshold 204 (FIG. 2) is set (410) to the OBSS packet-detect threshold 208 minus an offset. In some implementations, the offset is configurable and the method 400 includes configuring the offset. A CCA packet-detect threshold 206 (FIG. 2) is set (412) to be greater than the RxSOP threshold 204.

In some implementations, setting the OBSS packet-detect threshold 208 includes setting a composite threshold (CT) to the lesser of the minimum cell-size threshold or the highest signal strength and the OBSS packet-detect threshold 208 to the composite threshold. In some implementations, the RxSOP threshold 204 is set to the composite threshold minus the offset (γ):

$$CT=\min(\min\_cell\_size\_threshold, highest\_signal\_strength) \quad (1)$$

$$OBSS\_PD=CT \quad (2)$$

$$RxSOP=CT-\gamma \quad (3)$$

The first access point 102 avoids (414) decoding incoming packets when respective signal strengths of the incoming packets do not satisfy (e.g., are less than, or less than or equal to) the RxSOP threshold 204.

The first access point 102 avoids (416) initiating transmission when incoming packets from the other access points 102 or from the OBSS client devices 104 associated with the other access points 102 have signal strengths that satisfy (e.g., that exceed, or equal or exceed) the OBSS packet-detect threshold 208. In this situation, the channel is considered to be busy.

The first access point 102 avoids (418) initiating transmission when incoming packets from client devices 104 associated with (e.g., in the BSS 106 of) the first access point 102 have signal strengths that satisfy (e.g., that exceed, or equal or exceed) the CCA packet-detect threshold 210. In this situation, the channel is considered to be busy.

As discussed, the method 400 may be performed as part of step 304 of the method 300 (FIG. 3). The first access point 102 may perform steps 406, 408, 410, and/or 412 in turn at a time corresponding to a sequence in which each access point 102 of the plurality of access points performs these steps. In some implementations, the sequence is determined by ordering the plurality of access points based on the number of neighbors (e.g., on a home channel of each access point 102), from highest number of neighbors to lowest number of neighbors. The access point 102 with the highest number of neighbors thus may go first and the access point 102 with the lowest number of neighbors may go last.

Figure 5:
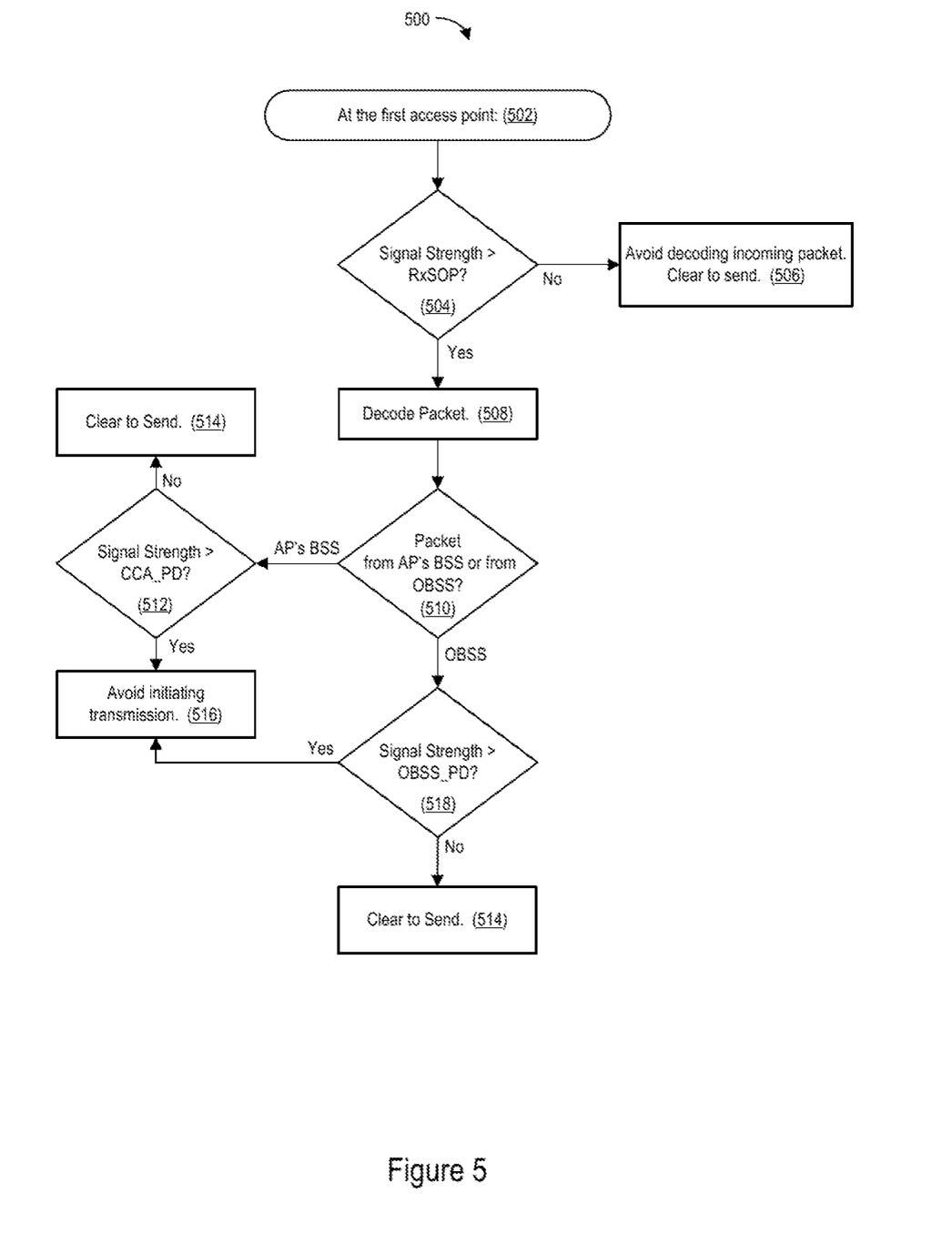
FIG. 5 is a flowchart illustrating a method of applying thresholds set in the method of FIG. 4 in accordance with some implementations.

FIG. 5 is a flowchart showing a method 500 that illustrates logic associated with steps 414, 416, and 418 in the method 400 (FIG. 4) in accordance with some implementations. The method 500 is performed (502) by the first access point 102 of the method 400 and may be performed repeatedly. The method 500 may be performed as part of the methods 300 and/or 400 (FIGS. 3-4).

The first access point 102 determines (504) whether a signal strength of an incoming packet satisfies (e.g., exceeds, or equals or exceeds) the RxSOP threshold 204 (FIG. 2). If not (504—No), the first access point 102 avoids decoding (i.e., does not decode) the incoming packet. The first access point 102 is clear to send, and thus clear to transmit a packet. An RTS/CTS exchange at this time will succeed.

If the signal strength of the incoming packet satisfies the RxSOP threshold 204 (504—Yes), the first access point 102 decodes (508) the incoming packet and determines (510) whether the packet is from a client device 104 in the BSS 106 of the first access point 102 or is from an OBSS device (e.g., a client device 104 in an OBSS or another access point 102). For example, the first access point 102 determines whether the decoded incoming packet specifies the OBSS color of the first access point 102 or of any of the other access points 102 in the plurality of access points.

If the packet is from a client device 104 in the BSS of the first access point 102 (e.g., specifies the OBSS color of the first access point 102), the first access point 102 determines (512) whether the signal strength satisfies (e.g., exceeds, or equals or exceeds) the CCA packet-detect threshold 206 (FIG. 2). If not (512—No), the first access point 102 is clear (514) to send (e.g., to transmit a packet). An RTS/CTS exchange at this time will succeed. If so (512—Yes), the first access point 102 avoids (516) initiating a transmission, because the channel is considered to be busy. An RTS/CTS exchange at this time will fail.

If the packet is from an OBSS device (e.g., a device that specifies the OBSS color of any of the other access points 102), the first access point 102 determines (518) whether the signal strength satisfies the OBSS packet-detect threshold 208 (FIG. 2). If so (518—Yes), the first access point 102 avoids (516) initiating a transmission. If not (518—No), the first access point 102 is clear (514) to send.

Figure 6:
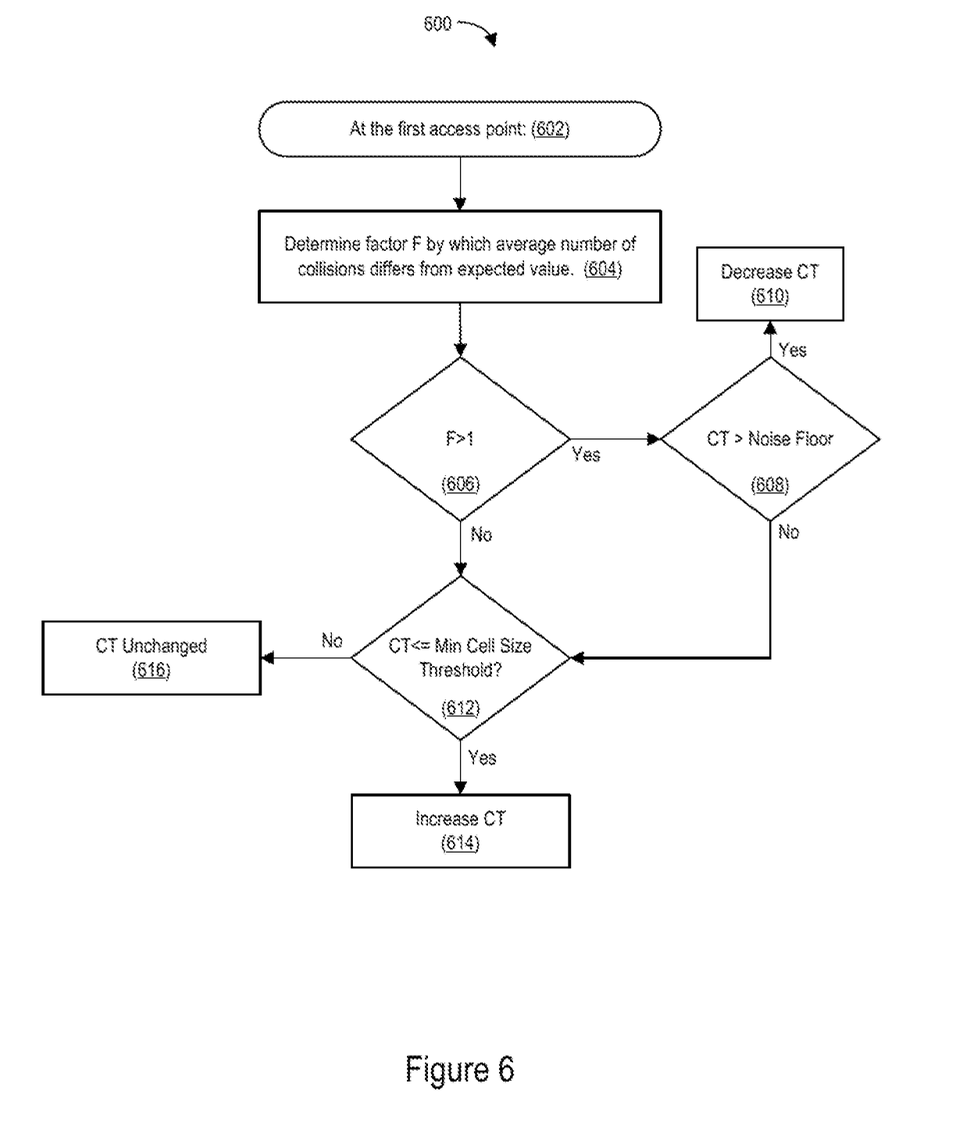
FIG. 6 is a flowchart illustrating a method of adjusting thresholds for an access point in accordance with some implementations.

FIG. 6 is a flowchart showing a method 600 of adjusting thresholds for an access point 102 in accordance with some implementations. The method 600 is an example of steps 306 and 308 of the method 300 (FIG. 3) for a single access point 102 (e.g., access point 102-1 or 102-2, FIG. 1) and thus may be performed as part of the method 300, after all or a portion of step 304 has been performed (e.g., after steps 406, 408, 410, and/or 412 of the method 400, FIG. 4, have been performed). The method 600 may be performed in conjunction with the methods 400 and/or 500 (FIGS. 4-5). The method 600 or portions thereof (e.g., steps 604 and/or 606) may be performed repeatedly (e.g., periodically).

The first access point 102 determines whether an average number of collisions (e.g., packet collisions and/or BSS color collisions) for the first access point exceeds an expected value. For example, the first access point 102 determines (604) a factor F by which an average number of collisions during a measurement period differs from an expected value (i.e., an expected number of collisions). If F is greater than one, the average number of collisions exceeds the expected value. If F is less than one, the average number of collisions is lower than the expected value. If F equals one, the average number of collisions equals the expected value.

In some implementations, the first access point 102 measures the average number of collisions based at least in part on RTS/CTS exchange failures, which measure packet collisions, and/or reports from client devices 104 of BSS color collisions.

In response to determining that the average number of collisions exceeds the expected value, the first access point 102 decreases the OBSS packet-detect threshold 208 and the RxSOP threshold 204 (FIG. 2). In some implementations, these thresholds are decreased in response to determining that the average number of collisions exceeds the expected value and that the OBSS packet-detect threshold 208 exceeds the noise floor 202. The difference between the OBSS packet-detect threshold 208 and the RxSOP threshold 204 remains equal to the offset. For example, the first access point 102 determines (606) whether F is greater than 1. If F is greater than 1 (606—Yes), such that the average number of collisions exceeds the expected value, then the first access point 102 determines (608) whether the composite threshold (CT), which equals the OBSS packet-detect threshold 208 per equation 2, exceeds the noise floor 202. If it does (608—Yes), then the composite threshold is decreased (610). The OBSS packet-detect threshold 208 and RxSOP threshold 204 are decreased accordingly, per equations 2 and 3.

If the average number of collisions does not exceed the expected value (606—No), then the first access point 102 determines whether the OBSS packet-detect threshold 208 satisfies the minimum cell-size threshold (i.e., the threshold set in step 404, FIG. 4). For example, if F is less than or equal to 1 (606—No), such that the average number of collisions does not exceed the expected value, then the first access point 102 determines (612) whether the composite threshold is less than or equal to the minimum cell-size threshold. Step 612 is also performed if the composite threshold does not exceed the noise floor (608—No). In these scenarios, if the composite threshold is greater than the minimum cell-size threshold (612—No), then the composite threshold is left unchanged (616), as are the OBSS packet-detect threshold 208 and RxSOP threshold 204, per equations 2 and 3. If, however, the composite threshold is less than or equal to the minimum cell-size threshold (612—Yes), then the composite threshold is increased (614), as are the OBSS packet-detect threshold 208 and RxSOP threshold 204, per equations 2 and 3. In some embodiments, however, the composite threshold is not increased if the increase would cause the RxSOP threshold 204 to exceed its maximum value. Step 614 thus is an example of how the OBSS packet-detect threshold 208 and the RxSOP threshold 204 may be increased in response to determining that the average number of collisions does not exceed the expected value and that the OBSS packet-detect threshold 208 does not satisfy (e.g., is less than or equal to, or less than) the minimum cell-size threshold.

In some implementations, the method 600 may further include determining whether an average number of collisions (e.g., packet collisions and/or BSS color collisions) for a neighboring access point 102 (e.g., access point 102-2, where the first access point is access point 102-1, or vice versa) exceeds the expected value (e.g., whether F>1 for the neighboring access point). This information may be reported by the neighboring access point 102 (e.g., via the wireless controller 110, FIG. 1). The OBSS packet-detect threshold 208 and the RxSOP threshold 204 are decreased in response to determining that the average number of collisions for the first access point 102 does not exceed (e.g., is less than) the expected value and that the average number of collisions for the neighboring access point 102 exceeds the expected value. The difference between the OBSS packet-detect threshold 208 and the RxSOP threshold 204 remains equal to the offset. For example, CT is decreased and the OBSS packet-detect threshold 208 and the RxSOP threshold 204 are decreased accordingly, per equations 2 and 3. This adjustment mitigates an imbalance in collision between neighboring cells.

The methods 300, 400, 500, and 600 allow thresholds to be set in a manner that results in low co-channel interference and low rates of collisions when BSSs overlap. The thresholds also ultimately influence cell size and whether a given client device 104 sticks to a single access point 102 or roams between access points 102 when moving about. The methods 300, 400, 500, and 600 allow for intelligent decisions regarding cell size and when to roam.

Figure 7:
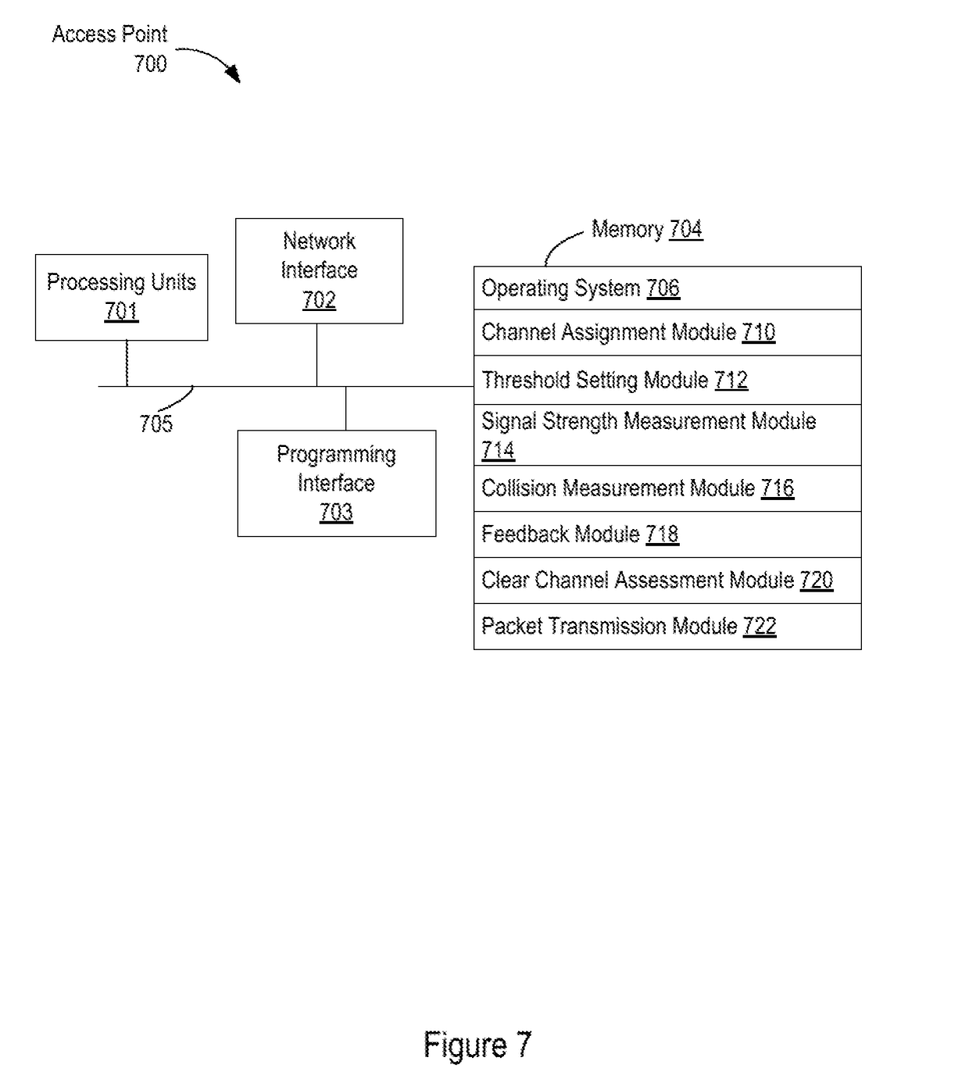
FIG. 7 is a block diagram of an access point in accordance with some implementations.

FIG. 7 is a block diagram of an access point 700 according to some implementations. The access point 700 is an example of an access point 102-1 or 102-2 (FIG. 1) and thus of an access point that performs all or a portion of the methods 300, 400, 500, and/or 600 (FIGS. 3-6). While certain features are illustrated, those of ordinary skill in the art will appreciate from the present disclosure that various other features have not been illustrated for the sake of brevity, and so as not to obscure more pertinent aspects of the implementations disclosed herein. To that end, in some implementations the access point 700 includes one or more processing units (e.g., CPUs, network processors, etc.) 701, a network interface 702, a programming interface 703, memory 704, and one or more communication buses 705 for interconnecting these and various other components. The network interface 702 includes a transmitter and a receiver.

In some implementations, the memory 704 or a non-transitory computer-readable storage medium of the memory 704 stores the following programs, modules, and data structures, or a subset thereof: an optional operating system 706, a channel-assignment module 710, a threshold-setting module 712, a signal-strength-measurement module 714, a collision-measurement module 716, a feedback module 718, a clear-channel-assessment module 720, and a packet transmission module 722. The memory 704 or a non-transitory computer-readable storage medium of the memory 704 thus may include instructions for performing all or a portion of the methods 300, 400, 500, and/or 600 (FIGS. 3-6).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first access point could be termed a second access point, and, similarly, a second access point could be termed a first access point, without changing the meaning of the description, so long as all occurrences of the first access point are renamed consistently and all occurrences of the second access point are renamed consistently. The first access point and the second access point are both access points, but they are not the same access point.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A networking method, comprising,
at a first access point of a plurality of access points in a wireless network, the first access point comprising one or more processors and memory storing instructions for execution by the one or more processors:
specifying a minimum cell-size threshold;
determining the highest signal strength at which the first access point detects transmissions from other access points or overlapping-basic-service-set (OBSS) client devices associated with the other access points;
setting an OBSS packet-detect threshold to the lesser of the minimum cell-size threshold or the highest signal strength;
setting a receiver start-of-packet (RxSOP) threshold to the OBSS packet-detect threshold minus an offset;
avoiding decoding incoming packets when respective signal strengths of the incoming packets do not satisfy the RxSOP threshold; and
avoiding initiating transmission when incoming packets from the other access points or from the OBSS client devices associated with the other access points have signal strengths that satisfy the OBSS packet-detect threshold.

2. The method of claim 1, wherein each access point of the plurality of access points is assigned a distinct OBSS color; the method further comprising, at the first access point:
decoding incoming packets when respective signal strengths of the incoming packets satisfy the RxSOP threshold;
determining whether the decoded incoming packets specify the OBSS color of any of the other access points; and
determining whether the signal strengths of decoded incoming packets that specify the OBSS color of any of the other access points satisfy the OBSS packet-detect threshold;
wherein avoiding initiating transmission is performed when the signal strengths of the decoded incoming packets that specify the OBSS color of any of the other access points satisfy the OBSS packet-detect threshold.

3. The method of claim 2, wherein packets transmitted by a respective access point and directed to the respective access point specify the OBSS color of the respective access point in their preambles.

4. The method of claim 1, further comprising, at the first access point, configuring the offset.

5. The method of claim 1, wherein setting the OBSS packet-detect threshold comprises:
setting a composite threshold to the lesser of the minimum cell-size threshold or the highest signal strength; and
setting the OBSS packet-detect threshold to the composite threshold.

6. The method of claim 5, wherein setting the RxSOP threshold comprises setting the RxSOP threshold to the composite threshold minus the offset.

7. The method of claim 1, further comprising, at the first access point:
setting a clear-channel-assessment (CCA) packet-detect threshold to be greater than the RxSOP threshold; and
avoiding initiating transmission when incoming packets from client devices associated with the first access point have signal strengths that satisfy the CCA packet-detect threshold.

8. The method of claim 1, wherein the first access point determines the highest signal strength, sets the OBSS packet-detect threshold, and sets the RxSOP threshold at a time corresponding to a sequence in which each access point of the plurality of access points in turn determines a respective highest signal strength, sets a respective OBSS packet-detect threshold, and sets a respective RxSOP threshold.

9. The method of claim 8, wherein the sequence is determined by ordering the plurality of access points based on the number of neighbors on a home channel of each access point, from highest number of neighbors to lowest number of neighbors.

10. The method of claim 1, further comprising, at the first access point, after determining the highest signal strength, setting the OBSS packet-detect threshold, and setting the RxSOP threshold:
determining whether an average number of collisions for the first access point exceeds an expected value; and
in response to determining that the average number of collisions exceeds the expected value, decreasing the OBSS packet-detect threshold and the RxSOP threshold, wherein the difference between the OBSS packet-detect threshold and the RxSOP threshold remains equal to the offset.

11. The method of claim 10, wherein determining whether the average number of collisions exceeds the expected value is performed repeatedly.

12. The method of claim 11, wherein determining whether the average number of collisions exceeds the expected value is performed periodically.

13. The method of claim 11, further comprising, at the first access point, after determining the highest signal strength, setting the OBSS packet-detect threshold, and setting the RxSOP threshold:
determining whether the OBSS packet-detect threshold does not satisfy the minimum cell-size threshold; and
in response to determining that the average number of collisions does not exceed the expected value and that the OBSS packet-detect threshold does not satisfy the minimum cell-size threshold, increasing the OBSS packet-detect threshold and the RxSOP threshold, wherein the difference between the OBSS packet-detect threshold and the RxSOP threshold remains equal to the offset.

14. The method of claim 10, further comprising, at the first access point, after determining the highest signal strength, setting the OBSS packet-detect threshold, and setting the RxSOP threshold:
determining whether the OBSS packet-detect threshold exceeds a noise floor;
wherein decreasing the OBSS packet-detect threshold and the RxSOP threshold are performed in response to determining that the average number of collisions exceeds the expected value and that the OBSS packet-detect threshold exceeds the noise floor.

15. The method of claim 10, further comprising, at the first access point, after determining the highest signal strength, setting the OBSS packet-detect threshold, and setting the RxSOP threshold:
determining whether an average number of collisions for a neighboring access point of the plurality of access points exceeds the expected value; and in response to determining that the average number of collisions for the first access point does not exceed the expected value and that the average number of collisions for the neighboring access point exceeds the expected value, decreasing the OBSS packet-detect threshold and the RxSOP threshold, wherein the difference between the OBSS packet-detect threshold and the RxSOP threshold remains equal to the offset.

16. The method of claim 10, wherein the collisions include packet collisions, the method further comprising, at the first access point, measuring the average number of packet collisions based at least in part on request-to-send/clear-to-send (RTS/CTS) exchange failures.

17. The method of claim 10, wherein the collisions include basic-service-set (BSS) color collisions, the method further comprising, at the first access point, measuring the average number of BSS color collisions based at least in part on reports from client devices of BSS color collisions.

18. An access point for deployment in a wireless network, comprising:
one or more processors; and
memory storing one or more programs for execution by the one or more processors, the one or more programs including instructions for:
specifying a minimum cell-size threshold;
determining the highest signal strength at which transmissions from other access points or overlapping-basic-service-set (OBSS) client devices associated with the other access points are detected;
setting an OBSS packet-detect threshold to the lesser of the minimum cell-size threshold or the highest signal strength;
setting a receiver start-of-packet (RxSOP) threshold to the OBSS packet-detect threshold minus an offset;
avoiding decoding incoming packets when respective signal strengths of the incoming packets do not satisfy the RxSOP threshold; and
avoiding initiating transmission when incoming packets from the other access points or from the OBSS client devices associated with the other access points have signal strengths that satisfy the OBSS packet-detect threshold.

19. A non-transitory computer-readable storage medium storing one or more programs configured for execution by a first access point in a wireless network, the one or more programs comprising instructions for:
specifying a minimum cell-size threshold;
determining the highest signal strength at which the first access point detects transmissions from other access points or overlapping-basic-service-set (OBSS) client devices associated with the other access points;
setting an OBSS packet-detect threshold to the lesser of the minimum cell-size threshold or the highest signal strength;
setting a receiver start-of-packet (RxSOP) threshold to the OBSS packet-detect threshold minus an offset;
avoiding decoding incoming packets when respective signal strengths of the incoming packets do not satisfy the RxSOP threshold; and
avoiding initiating transmission when incoming packets from the other access points or from the OBSS client devices associated with the other access points have signal strengths that satisfy the OBSS packet-detect threshold.

20. The non-transitory computer-readable storage medium of claim 19, wherein setting the OBSS packet-detect threshold comprises:
setting a composite threshold to the lesser of the minimum cell-size threshold or the highest signal strength; and
setting the OBSS packet-detect threshold to the composite threshold.

* * * * *

UNITED STATES PATENT AND TRADEMARK OFFICE
CERTIFICATE OF CORRECTION

PATENT NO. : 10,736,143 B2
APPLICATION NO. : 16/133580
DATED : August 4, 2020
INVENTOR(S) : Gautam Dilip Bhanage et al.

Page 1 of 1

It is certified that error appears in the above-identified patent and that said Letters Patent is hereby corrected as shown below:

In Column 1, Line 40, delete "BS Ss" and insert -- BSSs --, therefor.

Signed and Sealed this
Twenty-second Day of September, 2020

Andrei Iancu
*Director of the United States Patent and Trademark Office*